(12) United States Patent
Morita et al.

(10) Patent No.: US 9,559,383 B2
(45) Date of Patent: Jan. 31, 2017

(54) SEALED LITHIUM SECONDARY BATTERY

(75) Inventors: Masahiro Morita, Nisshin (JP); Toshihiko Mitsuhashi, Toyota (JP); Keisuke Ohara, Osaka (JP); Yuji Yokoyama, Moriguchi (JP); Yusuke Fukumoto, Moriguchi (JP); Tatsuya Hashimoto, Osaka (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 177 days.

(21) Appl. No.: 14/372,299

(22) PCT Filed: Jan. 17, 2012

(86) PCT No.: PCT/JP2012/050846
§ 371 (c)(1),
(2), (4) Date: Jul. 17, 2014

(87) PCT Pub. No.: WO2013/108365
PCT Pub. Date: Jul. 25, 2013

(65) Prior Publication Data
US 2014/0342200 A1    Nov. 20, 2014

(51) Int. Cl.
| | |
|---|---|
| *H01M 10/05* | (2010.01) |
| *H01M 10/0567* | (2010.01) |
| *H01M 10/0525* | (2010.01) |
| *H01M 10/42* | (2006.01) |
| *H01M 2/34* | (2006.01) |

(52) U.S. Cl.
CPC ......... *H01M 10/0567* (2013.01); *H01M 2/345* (2013.01); *H01M 10/0525* (2013.01); *H01M 10/4235* (2013.01); *H01M 2220/20* (2013.01); *Y02E 60/122* (2013.01); *Y02T 10/7011* (2013.01)

(58) Field of Classification Search
CPC ..................................................... H01M 10/05
See application file for complete search history.

(56) References Cited

U.S. PATENT DOCUMENTS

| | | | |
|---|---|---|---|
| 6,632,572 B1* | 10/2003 | Takahashi ............... | H01M 2/34 |
| | | | 252/62.2 |
| 2007/0015048 A1 | 1/2007 | Lee et al. | |
| 2010/0143773 A1* | 6/2010 | Honbou ............. | H01M 2/1077 |
| | | | 429/94 |

FOREIGN PATENT DOCUMENTS

| | | | |
|---|---|---|---|
| CN | 101213703 A | | 7/2008 |
| JP | 2000-021443 | * | 1/2000 |

(Continued)

*Primary Examiner* — Jacob Marks
(74) *Attorney, Agent, or Firm* — Finnegan, Henderson, Farabow, Garrett & Dunner, LLP (57) ABSTRACT

The present invention provides a sealed lithium secondary battery in which redox shuttle reactions of an aromatic compound that is an overcharge inhibitor are inhibited, and the aromatic compound decomposes appropriately, and a desired amount of gas can be generated more stably than in conventional instances, even in high-temperature environments. In the sealed lithium secondary battery (100), an electrode assembly (80) and an electrolyte are accommodated in a battery case (50) that is provided with a current interrupt device (30). The electrolyte comprises a compound that is capable of suppressing drops in viscosity of the electrolyte as a result of a rise in temperature in a temperature region up to 100° C., and an aromatic compound capable of generating hydrogen gas when a predetermined battery voltage is exceeded.

7 Claims, 6 Drawing Sheets

(56) References Cited

FOREIGN PATENT DOCUMENTS

JP 2001-85057 3/2001
JP 2006-324235 11/2006

* cited by examiner

FIG.6

SEALED LITHIUM SECONDARY BATTERY

CROSS-REFERENCE TO RELATED APPLICATIONS

This application is a national phase application of International Application No. PCT/JP2012/050846, filed Jan. 17, 2012, the content of which is incorporated herein by reference.

TECHNICAL FIELD

The present invention relates to a sealed lithium secondary battery (typically, a sealed lithium ion secondary battery). More specifically, the present invention relates to a sealed lithium secondary battery provided with a current interrupt device that is activated by rises in internal pressure.

BACKGROUND ART

Lithium secondary batteries, such as lithium ion batteries, boast smaller size, lighter weight and higher energy density than existing batteries. Accordingly, lithium secondary batteries are preferably used as so-called portable power sources in personal computers or mobile terminals, and as electric power sources for driving in vehicles.

Sealed lithium secondary batteries are one form of such batteries. One such battery has typically a construction wherein an electrode assembly comprising positive and negative electrodes, each provided with a mix layer that comprises an active material, is accommodated inside a battery case, together with an electrolyte (typically, an electrolyte solution), after which a lid body is fitted to close (seal) the battery case. The sealed lithium secondary battery is ordinarily used in a state where the voltage is limited so as to lie within a predetermined region (for instance, 3.0 V to 4.2 V). However, the predetermined voltage may in some instances be exceeded, and overcharge may occur, if more current than usual is supplied to the battery, for instance due to some malfunction.

Current interrupt devices (CIDs) that cut off charging current when pressure inside a battery case becomes equal to or higher than a predetermined value are one widely-known overcharge countermeasure technique. Ordinarily, a nonaqueous solvent or the like, in an electrolyte, becomes electrolyzed and generates a gas when the battery is brought to an overcharge state. On the basis of this gas generation, the current interrupt device cuts off the charging circuit of the battery, such that overcharge can be prevented to proceed any further.

Incorporating beforehand, into the electrolyte, a compound (hereafter referred to as "overcharge inhibitor") having an oxidation potential that is lower than that of the nonaqueous solvent of the electrolyte (i.e. a lower voltage at which an oxidative decomposition reaction starts), is a known method that is resorted to when using such current interrupt device. When the battery enters an overcharge state, such an overcharge inhibitor quickly undergoes oxidative decomposition, and generates hydrogen ions ($H^+$) as a result, at a positive electrode surface. The hydrogen ions diffuse into the electrolyte, and are reduced at the negative electrode, giving rise thereby to hydrogen gas ($H_2$). The internal pressure of the battery rises on account of the generated hydrogen gas, and as a result, the current interrupt device can be activated quickly. As an instance of such prior art, for example Patent document 1 discloses the feature of using cyclohexylbenzene (CHB) and/or biphenyl (BP) as an overcharge inhibitor.

CITATION LIST

Patent Literature

Patent document 1: Japanese Patent Application Publication No. 2006-324235
Patent document 2: Japanese Patent Application Publication No. 2001-85057

SUMMARY OF INVENTION

In such lithium secondary batteries, however, the viscosity of the electrolyte drops and the aromatic compound that is the overcharge inhibitor undergoes preferentially redox shuttle reactions when the temperature of the environment in which the battery is used and/or the environment in which the battery is stored rises (for instance, from 50° C. to 70° C.). The decomposition reaction of the aromatic compound, as necessary for generating the gas, is inhibited as a result. In large (or large-capacity) batteries that are used in electric power sources for driving in vehicles or the like, in particular, a large amount of gas is necessary for activating the current interrupt device, since the spatial volume in the battery is comparatively large. In a high-temperature environment, however, activation of the current interrupt device may be delayed, since the pressure in the battery case does not rise quickly, due to an insufficient gas generation amount.

In the light of the above, it is a goal of the present invention to provide a sealed lithium secondary battery comprising a current interrupt device that is activated as a result of a rise in pressure inside a battery case, such that the battery boasts better reliability (typically, safety in a wide range of temperature environments) while high battery performance is preserved.

To attain the above goal, a sealed lithium secondary battery is provided in which an electrode assembly comprising a positive electrode and a negative electrode, and an electrolyte, are accommodated inside a predetermined battery case. The electrolyte comprises a compound that is capable of suppressing drops in viscosity of the electrolyte as a result of a rise in temperature, in a temperature region up to 100° C., and an aromatic compound capable of generating hydrogen gas when a predetermined battery voltage is exceeded. The battery case is provided with a current interrupt device that is activated when the pressure inside the battery case rises as a result of generating the hydrogen gas.

Redox shuttle reactions of the aromatic compound that is the overcharge inhibitor become thus inhibited, even in a temperature region (typically up to 100° C., for instance from 25° C. to 100° C.) that is higher than room temperature, in a case where the electrolyte comprises a compound (hereafter referred to as "viscosity modifier") that is capable of suppressing drops in viscosity of the electrolyte as a result of a rise in temperature. Accordingly, the aromatic compound that is the overcharge inhibitor decomposes appropriately, and a desired gas amount can be generated more stably than in conventional instances, even in a high-temperature environment (for instance, 50° C. to 70° C.). The pressure inside the battery case can rise due to the generated gas. As a result, the current interrupt device can be activated more reliably. The reliability (safety over a wide temperature region (typically, up to 100° C., for instance from 0° C. to 70° C.)) of the sealed lithium secondary battery disclosed herein can be therefore enhanced compared to that of conventional instances.

Patent document 2 discloses a lithium secondary battery comprising the "curdlan" that is used in the present invention. Through gelling of the electrolyte, the purpose in this instance of conventional art is to suppress the decomposition reaction of the electrolyte, and prevent damage to the battery due to ejection of decomposition gas. Accordingly, the technology in Patent document 2 is used for uses different from those pertaining to the problem and goal of the present invention (specifically, generating a gas in a wide range of temperature environments, and activating a current interrupt device more reliably). Further, Patent document 2 does not disclose or suggest the current interrupt device or overcharge inhibitor that are constituent elements of the present invention. Moreover, the problem and goal of the present application cannot be solved/attained based on conventional art alone, as the test examples below show.

In a preferred aspect of the sealed lithium secondary battery disclosed herein, the battery may for instance comprise at least a polysaccharide as the compound that is capable of suppressing drops in viscosity of the electrolyte as a result of a rise in temperature.

The effect of the present invention (enhancing safety in a wide range of temperature environments) can be effectively brought out if the battery comprises a polysaccharide as the viscosity modifier. Further, polysaccharides have excellent biodegradability, to the extent of being amenable for use as food additives. Accordingly, polysaccharides are preferably used also from the viewpoint of safety and environmental protection.

In a preferred aspect of the sealed lithium secondary battery disclosed herein, the battery may for instance comprise at least curdlan as the polysaccharide.

The effect of the present invention can be brought out, to a yet higher degree, if the battery comprises curdlan as the polysaccharide.

In a preferred aspect of the sealed lithium secondary battery disclosed herein, the electrolyte may for instance exhibit a ratio ($V_{60}/V_{25}$) of viscosity at 25° C. ($V_{25}$) and viscosity at 60° C. ($V_{60}$) ranging from 0.8 to 10, as measured using a rheometer under a condition of shear rate 100 $s^{-1}$.

Redox shuttle reactions of the aromatic compound that is the overcharge inhibitor can be suppressed, even in a high-temperature environment, if the viscosity of the electrolyte lies within the above range. The decomposition reaction of the above aromatic compound is promoted as a result, and it becomes possible to obtain stably hydrogen gas in an amount necessary for reliably activating the current interruption device. Therefore, the effect of the present invention (i.e. enhancing safety in a wide range of temperature environments) can be brought out more effectively.

In a preferred aspect of the sealed lithium secondary battery disclosed herein, the addition amount of the compound that is capable of suppressing drops in viscosity of the electrolyte as a result of a rise in temperature may for instance range from 0.1 mass % to 10 mass % with respect to 100 mass % of the electrolyte.

If the addition amount of the viscosity modifier lies within the above range, the aromatic compound that is the overcharge inhibitor decomposes appropriately, even in a high-temperature environment, and there can be generated the necessary amount of gas for reliably activating the current cutoff device. The decomposition reaction is promoted, to a greater degree than in conventional instances, and, accordingly, the addition amount of the compound can be kept small. It becomes therefore possible to combine, to a yet higher degree, the effect of the present invention (namely, enhancing safety in a wide range of temperature environments) with excellent battery performance (for instance, high output density).

In a preferred aspect of the sealed lithium secondary battery disclosed herein, the battery may for instance comprise cyclohexylbenzene and/or biphenyl as the aromatic compound.

Cyclohexylbenzene and biphenyl have an oxidation potential ranging from about 4.5 V to 4.6 V. Accordingly, cyclohexylbenzene and biphenyl can undergo oxidative decomposition quickly during overcharge, and generate hydrogen gas, in batteries where a range of about 4.1 V to 4.2 V is set as the upper-limit charging voltage. The current interrupt device can be activated yet more quickly as a result.

In a preferred aspect of the sealed lithium secondary battery disclosed herein, an addition amount of the aromatic compound may for instance range from 0.5 mass % to 5 mass % with respect to 100 mass % of the electrolyte.

In the technology disclosed herein, hydrogen gas can be generated more stably than in conventional instances, even in a high-temperature environment (for instance, at 50° C. to 70° C.). Accordingly, the current interruption device can be activated more reliably. Therefore, the addition amount of the overcharge inhibitor can be reduced as compared with that of conventional instances, and, as a result, it becomes possible to combine, to a yet higher degree, the effect of the present invention (namely, enhancing safety in a wide range of temperature environments) with excellent battery performance (for instance, reduced battery resistance).

The present invention provides an assembled battery that is a combination of a plurality of sealed lithium secondary batteries (cells) disclosed herein. The sealed lithium secondary battery disclosed herein has enhanced reliability (typically safety in a wide range of temperature environments), and can accordingly be suitably used as an assembled battery.

The present invention provides a vehicle that comprises the above assembled battery as an electric power source for driving.

As a characterizing feature, the sealed lithium secondary battery disclosed herein exhibits, to a high degree, both enhanced reliability (safety in a wide range of temperature environments) with superior battery performance (for instance, reduced battery resistance). Therefore, the sealed lithium secondary battery can be used in applications that require high energy density and output density, and applications where the temperature of the environment in which the battery is used or stands may rise to a high temperature. Accordingly, the sealed lithium secondary battery can be suitably used, for instance, as a motive power source (electric power source for driving) for driving a motor installed in a vehicle (typically, an electric motor such as that of a plug-in hybrid automobile (PHV), hybrid automobile (HV) or electric vehicle (EV)).

DESCRIPTION OF EMBODIMENTS

The term "lithium secondary battery" in the present description denotes a secondary battery in which lithium ions are used as electrolyte ions, such that charge and discharge are realized through movement of the charge associated with lithium ions, between positive and negative electrodes. Ordinarily, storage elements referred to as lithium ion batteries (or lithium ion secondary batteries), lithium polymer batteries and lithium ion capacitors are typical examples that encompass the lithium secondary battery disclosed herein. In the present description, the term "active material" denotes a substance (compound) that is involved in electric storage, on the positive electrode side or the negative electrode side. That is, active material denotes a substance that is involved in storage and release of electrons during charge and discharge of the battery.

In the present description, the term "overcharge state" denotes a state in which the charge depth (SOC, state of charge) has exceeded 100%. Further, SOC denotes a state of charge such that, in an operating voltage range that allows for reversible charge and discharge, 100% is a state of charge in which voltage of the upper limit of that range is obtained is taken as 100%, and a state of charge in which voltage of the lower limit of that range is obtained (i.e. an uncharged state) is taken as 0%.

Embodiments of the sealed lithium secondary battery disclosed herein are explained next. Any features other than the features specifically set forth in the present description and which may be necessary for carrying out the present invention can be regarded as instances of design matter for a person skilled in the art on the basis of conventional techniques in the technical field in question. A sealed lithium secondary battery having such a structure can be realized on the basis of the disclosure in the present description and on the basis of common technical knowledge in the technical field in question.

As the positive electrode of the sealed lithium secondary battery disclosed herein there is used a positive electrode configured by forming a positive electrode mix layer (also referred to as positive electrode active material layer), through application, onto a positive electrode collector, of a slurry-like (including paste-like and ink-like forms) composition (hereafter, "positive electrode mix slurry") prepared by mixing, in an appropriate solvent, a positive electrode active material, a conductive material, a binder (binding agent) and so forth.

The method for preparing the positive electrode mix slurry may involve, for instance, kneading the above positive electrode active material, conductive material and binder, at one time or stepwise over several times. Although not particularly limited thereto, the solids concentration (NV) of the positive electrode mix slurry can be set to a range of about 50% to 75% (preferably, 55% to 65%, more preferably 55% to 60%). The method that can be resorted to for forming the positive electrode mix layer is preferably a method that involves coating one face or both faces of the positive electrode collector with an appropriate amount of the positive electrode mix slurry, using a conventionally known coating device (for instance, slit coater, die coater, a comma coater, gravure coater or the like) followed by drying.

Examples of the material of the positive electrode collector include, for instance, aluminum, nickel, titanium, stainless steel and the like. The shape of the collector may vary depending on, for instance, the shape of the battery to be constructed. Accordingly, the shape of the collector is not particularly limited, and a rod-like body, a plate-like body, a foil-like body or a mesh-like body can be adopted herein. A foil-like body is mainly used in a battery provided with a below-described wound electrode assembly. The thickness of the foil-like collector is not particularly limited, but a collector can be preferably used that has a thickness ranging from about 5 μm to 50 μm (more preferably, from about 8 μm to 30 μm), in terms of the trade-off between capacity density of the battery and collector strength.

Herein there can be used, without particular restrictions, one or two or more types of various positive electrode active materials that are conventionally used in lithium secondary batteries. Examples thereof include, for instance, oxides (lithium transition metal oxides) that comprise lithium and transition metal elements as constituent metal elements, such as lithium nickel oxides (for instance, $LiNiO_2$), lithium cobalt oxides (for instance, $LiCoO_2$) and lithium manganese oxides (for instance, $LiMn_2O_4$), as well as phosphates comprising lithium and a transition metal element as constituent metal elements, for instance lithium manganese phosphate ($LiMnPO_4$), lithium iron phosphate ($LiFePO_4$) or the like. Among the foregoing there is preferably used a positive electrode active material (typically, a positive electrode active material comprising substantially a lithium-nickel-cobalt-manganese complex oxide) having, as a main component, a lithium-nickel-cobalt-manganese complex oxide (for instance, $LiNi_{1/3}Co_{1/3}Mn_{1/3}O_2$) of layered structure and represented by general formula $LiNiCoMnO_2$, since such a positive electrode active material boasts excellent thermal stability and high energy density. Although not particularly limited thereto, the proportion of positive electrode active material in the positive electrode mix layer as a whole is typically about 50 mass % or more (typically, from 70 mass % to 99 mass %), and ranges preferably from about 80 mass % to 99 mass %.

The term lithium-nickel-cobalt-manganese complex oxide encompasses, other than oxides having Li, Ni, Co and Mn as constituent metal elements, also oxides that comprise at least one metal element other than Li, Ni, Co and Mn (transition metal element and/or typical metal element other than Li, Ni, Co and Mn). Such metal elements may be one or two or more elements from among magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pb), platinum (Pt), copper (Cu), zinc (Zn), boron (B), aluminum (Al), gallium (Ga), indium (In), tin (Sn), lanthanum (La) and cerium (Ce). The same applies to lithium nickel oxides, lithium cobalt oxides and lithium manganese oxides. The amount of such substitutional constituent elements is not particularly limited, and may be, for instance, 0.1 mass % or more (typically, 0.2 mass % or more, for instance 0.3 mass % or more), and 1.0 mass % or less (typically 0.8 mass % or less, for instance, 0.7 mass % or less) with respect to 100 mass % as the total of the substitution element plus Ni, Co and Mn.

For instance, a lithium transition metal oxide powder prepared in accordance with conventionally known methods can be used, as-is, as such lithium transition metal oxide (which is typically in particulate form). The particle size of the powder is not particularly limited, and, for instance, may range from about 1 μm to 25 μm (preferably, from 2 μm to 10 μm). In the present description, the term "particle size" denotes the particle size ($D_{50}$ particle size, median size) that corresponds to a cumulative value of 50%, from the fine particle side, in a volume-basis particle size distribution measured on the basis of a particle size distribution measurement in accordance with an ordinary laser diffraction-light scattering method.

As the solvent there can be used, without particular restrictions, one or two or more solvents that are conventionally used in lithium secondary batteries. Such solvents are roughly divided into aqueous and organic solvents. Examples of organic solvents include, for instance, amides, alcohols, ketones, esters, amines, ethers, nitriles, cyclic ethers, aromatic hydrocarbons and the like. More specific examples include, for instance, N-methyl-2-pyrrolidone (NMP), N,N-dimethylformamide (DMF), N,N-dimethylacetamide, 2-propanol, ethanol, methanol, acetone, methyl ethyl ketone, methyl propenoate, cyclohexanone, methyl acetate, ethyl acetate, methyl acrylate, diethyltriamine, N,N-dimethylaminopropyl amine, acetonitrile, ethylene oxide, tetrahydrofuran (THF), dioxane, benzene, toluene, ethylbenzene, xylene, dimethyl sulfoxide (DMSO), dichloromethane, trichloromethane, dichloroethane and the like. Herein N-methyl-2-pyrrolidone (NMP) can suitably used. Preferably, the aqueous solvent is water or a mixed solvent having water as a main constituent. As the solvent other than water and that makes up the above mixed solvent there can be used one or two or more types of solvent appropriately selected from among organic solvents (for instance, lower alcohols, lower ketones or the like) that can mix homogeneously with water. For instance, an aqueous solvent is preferably used wherein water is about 80 mass % or more (more preferably, about 90 mass % or more, yet more preferably about 95 mass % or more) of the aqueous solvent. In a particularly preferred example, the aqueous solvent comprises substantially water (for instance, the aqueous solvent is water).

One, two or more types of various conductive materials that are conventionally used in lithium secondary batteries can be used, without particular restrictions, as the conductive material. For instance, one or two or more types selected from among carbon materials such as carbon black (for instance, acetylene black, furnace black, Ketjen black, channel black, lamp black, thermal black or the like), coke, graphite (natural graphite and modified products thereof, synthetic graphite) and carbon fibers (PAN-based carbon fibers, pitch-based carbon fibers) can be used herein. Alternatively, metallic fibers (for instance, of Al or SUS), conductive metal powders (for instance, of Ag, Ni, Cu or the like), metal oxides (for instance, ZnO, $SnO_2$ or the like), or synthetic fibers surface-coated with a metal may be used herein. Preferred conductive materials among the foregoing include carbon black (typically, acetylene black) having a small particle size and large specific surface area. Although not particularly limited thereto, the proportion of conductive material in the positive electrode mix layer as a whole can be set, for instance, to range from about 0.1 mass % to 15 mass %, and preferably from about 1 mass % to 10 mass % (more preferably from 2 mass % to 6 mass %).

The binder is a compound that can dissolve or disperse homogeneously in the above-described solvent. Herein there can be used one or two or more substances conventionally used in lithium secondary batteries, without any particular restrictions. A polymer material that disperses or dissolves in an organic solvent may be preferably used in a case where, for instance, the positive electrode mix layer is formed using a solvent-based liquid composition (solvent-based composition wherein the main component of a dispersion medium is an organic solvent). Specific examples of such a polymer material include, for instance, polyvinylidene fluoride (PVdF), polyvinylidene chloride (PVdC), polyethylene oxide (PEO) and the like. Alternatively, a polymer material that dissolves or disperses in water can be preferably used in a case where the positive electrode mix layer is formed using an aqueous liquid composition. Examples of such polymer materials include, for instance, cellulosic polymers, fluororesins, vinyl acetate copolymers, rubbers and the like. More specific examples include, for instance, carboxymethyl cellulose (CMC), hydroxypropylmethyl cellulose (HPMC), polyvinyl alcohol (PVA), polytetrafluoroethylene (PTFE), tetrafluoroethylene-hexafluoropropylene copolymers (FEP), styrene-butadiene rubber (SBR), acrylic-acid modified SBR resins (SBR latex) and the like. Although not particularly limited thereto, the proportion of the binder in the positive electrode mix layer as a whole can be set, for instance, to range from 0.1 mass % to 10 mass % (preferably, from 1 mass % to 5 mass %).

Various additives or the like (for instance, inorganic compounds that generate gas during overcharge, or materials that may function as dispersants) may be added to the positive electrode mix slurry prepared herein, so long as the effect of the present invention is not impaired thereby. Examples of inorganic compounds that generate gas during overcharge include, for instance, carbonates, oxalates and nitrates. For instance, lithium carbonate or lithium oxalate is preferably used herein. Examples of the dispersant include, for instance, polymer compounds having hydrophobic chains and hydrophilic groups (for instance, in the form of alkali salts, typically sodium salts), anionic compounds having sulfates, sulfonates, phosphates or the like, and cationic compounds such as amines or the like. More specific examples include, for instance, carboxymethyl cellulose (CMC), methyl cellulose, ethyl cellulose, hydroxyethyl cellulose, hydroxypropyl cellulose, butyral, polyvinyl alcohol, modified polyvinyl alcohol, polyethylene oxide, polyvinyl pyrrolidone, polyacrylic acid, polycarboxylic acids and the like.

Thereafter, the positive electrode mix layer is dried by resorting to appropriate drying means, to remove the solvent comprised in the positive electrode mix slurry. Examples of appropriate methods that can be adopted herein include, for instance, natural drying, hot air drying, low-humidity air drying, vacuum drying, infrared drying, far-infrared ray drying, electron beam drying and the like, singly or in combination.

After drying of the positive electrode mix slurry, the thickness and/or density of the positive electrode mix layer can be adjusted by performing a pressing treatment as appropriate (for instance, by relying on various conventionally known pressing methods such as roll pressing or plate pressing). Capacity per unit volume may decrease if the density of the positive electrode mix layer that is formed on the positive electrode collector is very low. If the density of the positive electrode mix layer is extremely high, internal resistance tends to rise, in particular during large-current charge and discharge and during charge and discharge at low temperature. Accordingly, the density of the positive electrode mix layer can be set to be for instance 2.0 g/cm$^3$ or higher (typically, 2.5 g/cm$^3$ or higher), and 4.2 g/cm$^3$ or lower (typically, 4.0 g/cm$^3$ or lower).

As the negative electrode of the sealed lithium secondary battery disclosed herein there is used a negative electrode configured by forming a negative electrode mix layer (also referred to as negative electrode active material layer) through application, onto a negative electrode collector, of a slurry-like (including paste-like and ink-like forms) composition (hereafter, "negative electrode mix slurry") prepared by mixing, in an appropriate solvent, a negative electrode active material, a binder and so forth. As in the case of the above-described positive electrode, a method that can be preferably used, as a method for forming the negative electrode mix layer, involves coating one or both faces of a negative electrode collector with an appropriate amount of the negative electrode mix slurry, followed by drying.

Examples of the material of the negative electrode collector include, for instance, copper, nickel, titanium, stainless steel and the like. The form of the negative electrode collector is not particularly limited, and a rod-like body, a plate-like body, a foil-like body or a mesh-like body can be resorted to herein. A foil-like body is mainly used in a battery provided with the below-described wound electrode assembly. The thickness of the foil-like collector is not particularly limited, but there can be preferably used a collector having a thickness ranging from about 5 µm to 50 µm (more preferably, from about 8 µm to 30 µm) in terms of the trade-off between capacity density of the battery and collector strength.

One, two or more types of various negative electrode active materials that are conventionally used in lithium secondary batteries can be used herein without particular restrictions. For instance, there can be preferably used: graphite such as natural graphite and modified products thereof, or synthetic graphite produced from petroleum or coal-based materials; a carbon material (of low crystallinity) having, at least partly, a graphite structure (layered structure), such as hard carbon (hardly graphitizable carbon), soft carbon (easily graphitizable carbon), carbon nanotubes and the like; a metal oxide such as a lithium titanium complex oxide; or an alloy of tin (Sn) or silicon (Si) with lithium. Among the foregoing, a graphitic carbon material (typically, graphite) that affords large capacity can preferably be used herein. The proportion of the negative electrode active material in the negative electrode mix layer as a whole is not particularly limited, but an appropriate proportion is ordinarily set to about 50 mass % or more, preferably from about 90 mass % to 99 mass % (for instance, from about 95 mass % to 99 mass %).

As the binder there can be selected an appropriate binder from among the polymer materials that have been exemplified above as the binder for the positive electrode mix layer. Specific examples include, for instance, styrene-butadiene rubber (SBR), polyvinylidene fluoride (PVdF), polytetrafluoroethylene (PTFE) and the like. It suffices that the proportion of binder in the negative electrode mix layer as a whole be appropriately selected in accordance with the type and amount of the negative electrode active material. For instance, the proportion of binder can be set to a range of 1 mass % to 10 mass % (preferably, 2 mass % to 5 mass %).

In addition, various additives (for instance, an inorganic compound that generates a gas during overcharge, or a polymer material that can function as a dispersant) and conductive materials described above can also be used as appropriate.

After drying of the negative electrode mix slurry, the thickness and density of the negative electrode mix layer can be adjusted by performing, as appropriate, a pressing treatment (for instance, by relying on various conventionally known pressing methods such as roll pressing or plate pressing), as in the case of the positive electrode. The density of the negative electrode mix layer can be set for instance to 1.1 g/cm$^3$ or higher (typically, 1.2 g/cm$^3$ or higher, for instance 1.3 g/cm$^3$ or higher), and 1.5 g/cm$^3$ or lower (typically 1.49 g/cm$^3$ or lower).

An electrode assembly is produced through stacking of the above positive electrode and the negative electrode. The shape of the electrode assembly is not particularly limited, but for instance, a wound electrode assembly can be used that is obtained by stacking an elongate positive electrode wherein a positive electrode mix layer of predetermined width is formed, on an elongate positive electrode collector, along the longitudinal direction of the collector, and an elongate negative electrode wherein a negative electrode mix layer of predetermined width is formed, on an elongate negative electrode collector, along the longitudinal direction of the collector, and by winding the resulting stack in the longitudinal direction. Heat dissipation is comparatively low in such an electrode assembly (typically, at the central portion of the electrode assembly). Accordingly, a concern arises in that generation of gas necessary for activating the current interruption device during overcharge (i.e. for eliciting a rise in the internal pressure within the battery case) might be suppressed. In the battery disclosed herein, however, a desired amount of gas can be generated stably under a wide range of temperature environments. Accordingly, it becomes possible to achieve the current interrupt device more reliably than in the above instance.

The electrode assembly, the electrolyte and the overcharge inhibitor are accommodated in an appropriate battery case, to construct a sealed lithium secondary battery. The case is provided with a safety mechanism in the form of a current interrupt device (mechanism that allows cutting current off in response to a rise in the case internal pressure derived from the generation of the above gas during overcharge of the battery).

In a typical configuration of the sealed lithium secondary battery disclosed herein, a separator is interposed between the positive electrode and the negative electrode. Various porous sheets that are identical to those utilized in conventional lithium secondary batteries can be used herein as the separator. Examples include, for instance, porous resin sheets (films, non-woven fabrics and the like) comprising a polyolefin resin made up of a resin such as polyethylene (PE), polypropylene (PP), polyester, cellulose, polyamide or the like. The porous resin sheet may have a single-layer structure or a multilayer structure with two or more layers (for instance, a three-layer structure in which a PP layer is provided on both sides of a PE layer). The above electrolyte may double as the separator in a sealed lithium secondary battery (lithium polymer battery) that utilizes a solid-state electrolyte.

Materials and shapes used in conventional lithium secondary batteries can be resorted to in the battery case. Examples of the material of the case include, for instance, a comparatively lightweight metallic material such as aluminum or steel, or a resin material such as PPS, a polyimide resin or the like. The shape (external form of the container) is not particularly limited, and may be for instance a cylindrical, square, parallelepiped, coin-like or bag-like shape.

One, two or more types of nonaqueous electrolyte used in conventional lithium secondary batteries can be used herein, without particular restrictions, as the electrolyte. The nonaqueous electrolyte has typically a composition wherein a supporting salt (lithium salt) is incorporated into an appropriate nonaqueous solvent, but the electrolyte may be a solid-state electrolyte (typically, a so-called gel electrolyte) in which a polymer is added to a liquid electrolyte.

Examples of the nonaqueous solvent that can be used include, for instance, aprotic solvents such as carbonates, esters, ethers, nitriles, sulfones, lactones and the like. Specific examples include, for instance, ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyl tetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone and the like. For instance, a nonaqueous solvent having a carbonate as a main constituent is preferably used, since this allows forming a coating film (SEI: solid electrolyte interphase) on the negative electrode active material surface. Among the foregoing there can be preferably used, for instance, EC, which has a high relatively permittivity, or DMC and EMC, which have a high standard oxidation potential (specifically, a wide potential window). For instance, a nonaqueous solvent is preferably used that comprises one or two or more carbonates, such that the total volume of the carbonates takes up 60 vol % or more (more preferably, 75 vol % or more, yet more preferably 90 vol % or more, and substantially 100 vol %) of the volume of the nonaqueous solvent as a whole.

Examples of the supporting salt include, for instance, $LiPF_6$, $LiBF_4$, $LiClO_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like. Among the foregoing $LiPF_6$ is preferably used. The concentration of the electrolyte is not particularly limited, but the amount of lithium ions comprised in the electrolyte tends to become insufficient, and ion conductivity tends to drop, when the concentration of the electrolyte is excessively low. The viscosity of the nonaqueous electrolyte tends to increase, and ion conductivity tends to decrease, if the concentration of the supporting electrolyte is excessively high. Accordingly, a nonaqueous electrolyte is preferably used that contains the electrolyte at a concentration of about 0.1 mol/L to 5 mol/L (preferably, about 0.8 mol/L to 1.5 mol/L).

A compound (viscosity modifier) capable of curtailing drops in viscosity of the electrolyte as a result of a rise in temperature at a temperature region up to 100° C., and an aromatic compound capable of generating hydrogen gas when a predetermined battery voltage is exceeded, are added to the electrolyte of the sealed lithium secondary battery disclosed herein. If the electrolyte comprises a viscosity modifier, drops in the viscosity of the electrolyte can be suppressed within a temperature region higher than room temperature (typically, 20° C. or higher). Accordingly, the aromatic compound that is the overcharge inhibitor decomposes appropriately, and a desired amount of gas can be generated more stably than in conventional instances, even in a high-temperature environment (typically, 50° C. to 100° C., for instance 50° C. to 70° C.). The pressure inside the battery case can rise as a result of the generation of the gas. Accordingly, in the sealed lithium secondary battery disclosed herein, the current interrupt device can be activated more reliably in a temperature environment (typically, up to 100° C., for instance 0° C. to 70° C.) that is wider than conventional ones.

Preferably, a ratio ($V_{60}/V_{25}$) of the viscosity at 25° C. ($V_{25}$) and the viscosity at 60° C. ($V_{60}$) of the electrolyte ranges from 0.8 to 10. The redox shuttle reaction of the aromatic compound that is the overcharge inhibitor can be suppressed, even in a high-temperature environment, if the viscosity of the electrolyte lies within the above range. As a result, the aromatic compound decomposes appropriately, and hydrogen gas can be obtained stably in the amount necessary for activating the current interruption device reliably. Therefore, the effect of the present invention (i.e. enhancing safety in a wide range of temperature environments) can be brought out more effectively.

Unless otherwise stated, the term "viscosity" in the present invention denotes viscosity (mPa·sec) that is measured under a condition of shear rate of 100 $s^{-1}$, using an ordinary rheometer. The method for measuring viscosity will be explained in detail in the examples described below.

One, two or more compounds that dissolve or disperse homogeneously in the electrolyte that is used and such that the temperature of the compound increases as a result of a rise in environmental temperature (including instances of gelling) can be appropriately used herein as the compound (viscosity modifier) that allows suppressing the drop in viscosity of the electrolyte as a result of a rise in temperature. Such compound is not particularly limited, and there can be used a polymer (natural polymer) obtained from natural sources, in accordance with known methods, or a compound that results from processing (typically, by physical or chemical modification) the above polymer. Among the foregoing, a polymer compound (hereinafter referred to as polysaccharide) wherein a plurality (for instance, 10 or more) of monosaccharides (monosaccharides and derivatives thereof) is bonded by way of glucosidic bonds can be preferably used among the foregoing. The effect of the present invention (enhancing safety in a wide range of temperature environments) can be elicited appropriately while securing superior battery performance (for instance, high output density), if the electrolyte comprises a polysaccharide. Further, polysaccharides have excellent biodegradability, to the extent of being used as food additives. Accordingly, polysaccharides are preferably used also from the viewpoint of safety and environmental protection. More specific examples include, for instance, curdlan, starch, dextrin, glucomannan, agarose, carrageenan, guar gum, locust bean gum, tragacanth gum, quince seed gum, xanthan gum, gum arabic, pullulan, agar, konjac mannan and the like. Among the foregoing there is preferably used curdlan (1,3-glucan) with glucosidic bonds at the C1 and C3 positions of D-glucose. The viscosity modifier comprised in the electrolyte can be analyzed qualitatively and quantitatively, for instance, by ordinary high-performance liquid chromatography (HPLC).

The addition amount of the viscosity modifier is not particularly limited; herein, the viscosity modifier can be used in an amount of 0.1 mass % or more (for instance, 1 mass % or more), and 10 mass % or less (typically, less than 10 mass %, preferably 5 mass % or less) with respect to 100 mass % of the electrolyte. If the above range is satisfied, the aromatic compound that is the overcharge inhibitor decomposes appropriately, even in a high-temperature environment, and there can be generated the necessary amount of gas for activating the current interruption device reliably. Therefore, it becomes possible to combine, to a high degree, the effect of the present invention (namely, enhancing safety in a wide range of temperature environments) with excellent battery performance.

The molecular weight of the polymer compound is not particularly limited, but ordinarily, viscosity is insufficient and dispersion unstable if the weight-average molecular weight (Mw) of the polymer compound that is used is excessively low. If the molecular weight of the polymer compound that is used is extremely large, conversely, lithium ion migration that accompanies battery reactions is hindered, and battery performance may become impaired as a result (typically, the battery resistance increases). Accordingly, the value of weight-average molecular weight (Mw) calculated using Expression (1), on the basis of a molecular weight distribution obtained by GPC (gel permeation chromatography)-RI (refractive index; differential refractive index detector), can be set to range from 10,000 to 500,000 (preferably, from 50,000 to 300,000).

$$Mw = \Sigma(M_i \times W_i)/W = \Sigma(M_i \times H_i)/\Sigma H_i \quad (1)$$

where $M_i$: molecular weight of i-th eluted component
$W_i$: weight of the i-th eluted component
W: total weight of the components
$H_i$: peak height of the i-th eluted component As the aromatic compound there can be used, without any particular restrictions, one or two or more substances conventionally used in lithium secondary batteries, so long as the substance has an oxidation potential equal to or higher than the operating voltage of the lithium secondary battery, and generates a gas when decomposing in an overcharge state. Specifically, in a case where, for instance, a battery is used that operates within the range of 3.0 V to 4.1 V, a compound is preferably used that has a high oxidation potential, of operating upper-limit voltage +0.1 V (typically, +0.2 V, for instance +0.3 V). More preferably, there are mixed two or more compounds having dissimilar oxidation potentials.

Specific examples include, for instance, biphenyl compounds, alkyl biphenyl compounds, cycloalkyl benzene compounds, alkyl benzene compounds, organophosphorus compounds, fluorine-substituted aromatic compounds, carbonate compounds, cyclic carbamate compounds, alicyclic hydrocarbons and the like. More specific examples include, for instance, biphenyl (BP), cyclohexyl benzene (CHB), trans-butyl cyclohexyl benzene, cyclopentyl benzene, t-butyl benzene, t-amino benzene, terphenyl, 2-fluorobiphenyl, 3-fluorobiphenyl, 4-fluorobiphenyl, 4,4'-difluorobiphenyl, o-cyclohexyl fluorobenzene, p-cyclohexyl fluorobenzene, tris-(t-butyl phenyl) phosphate, phenyl fluoride, 4-fluorophenyl acetate, diphenyl carbonate, methyl phenyl carbonate, bis-tert-butyl phenyl carbonate, diphenyl ether, dibenzofuran and the like. In a battery where, for instance, 4.1 V to 4.2 V is set as the upper-limit charging voltage, an aromatic compound can be preferably used that has a comparatively low oxidation potential, from about 4.5 to 4.6 V, for instance cyclohexylbenzene (CHB) or biphenyl (BP); more preferably, a mixture of the foregoing two is used herein.

If the addition amount is excessively small, the amount of aromatic compound that is added to the electrolyte is not particularly limited; however, the amount of gas generated during overcharge is small, and thus the current interrupt device may fail to operate normally. Battery performance may become impaired (for instance, increased battery resistance or worsened cycle characteristic) if, with an emphasis on safety, an excessive amount of aromatic compound is added. Therefore, the addition amount of the aromatic compound with respect to 100 mass % of the electrolyte can be set to, for instance, about 0.1 mass % or more (typically, 0.5 mass % or more, for instance 1 mass % or more) and 5 mass % or less (typically 4 mass % or less, for instance 3 mass % or less, and preferably 2 mass % or less). In the technology disclosed herein, hydrogen gas can be generated more stably than in conventional instances, even in a high-temperature environment (for instance, at 50° C. to 70° C.). Accordingly, the current interruption device can be operated more reliably. Therefore, the addition amount of the overcharge inhibitor can be made lower than in conventional instances, and, as a result, it becomes possible to combine, to a yet higher degree, excellent battery performance (for instance, reduced battery resistance) with the effect of the present invention (namely, enhancing safety in a wide range of temperature environments).

The current interrupt device is not particularly limited, so long as current can be cut off in response to a rise in the pressure inside the battery case (i.e. a rise in internal pressure triggers the operation of the current interrupt device). Herein, a mechanism identical to that of any mechanism conventionally known can be appropriately used as the current interrupt device that is provided in this type of batteries. As an example, a configuration such as the one illustrated in FIG. 2 described below can be preferably resorted to herein. When the internal pressure of the battery case rises in this configuration, a member that makes up a conductive path from an electrode terminal to the electrode assembly deforms and moves away from another member, and the conductive path is cut off as a result.

Figure 1:
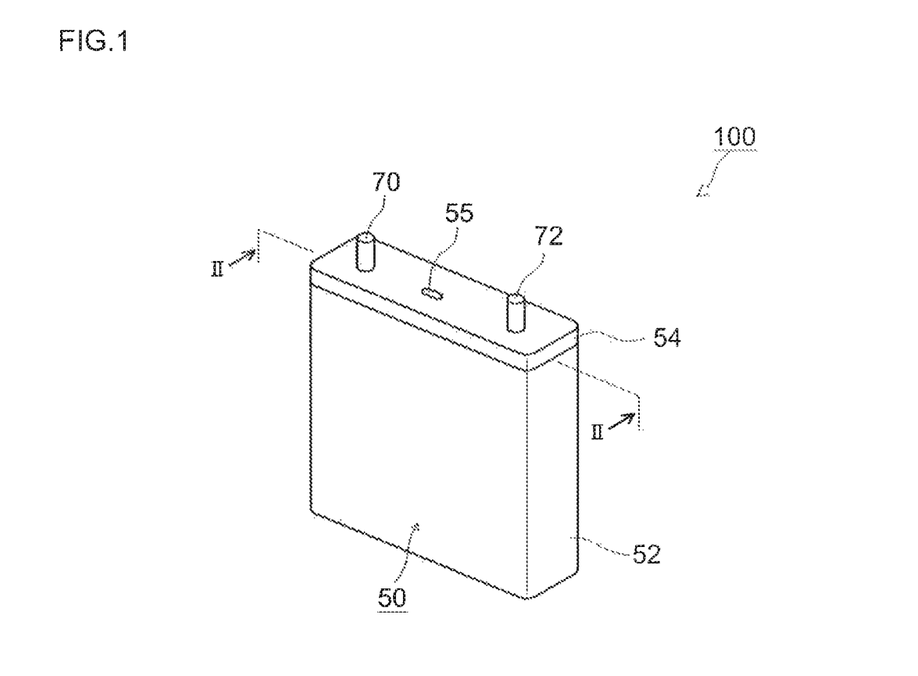
FIG. 1 is a perspective-view diagram illustrating schematically the external form of a sealed lithium secondary battery according to an embodiment of the present invention.
Figure 2:
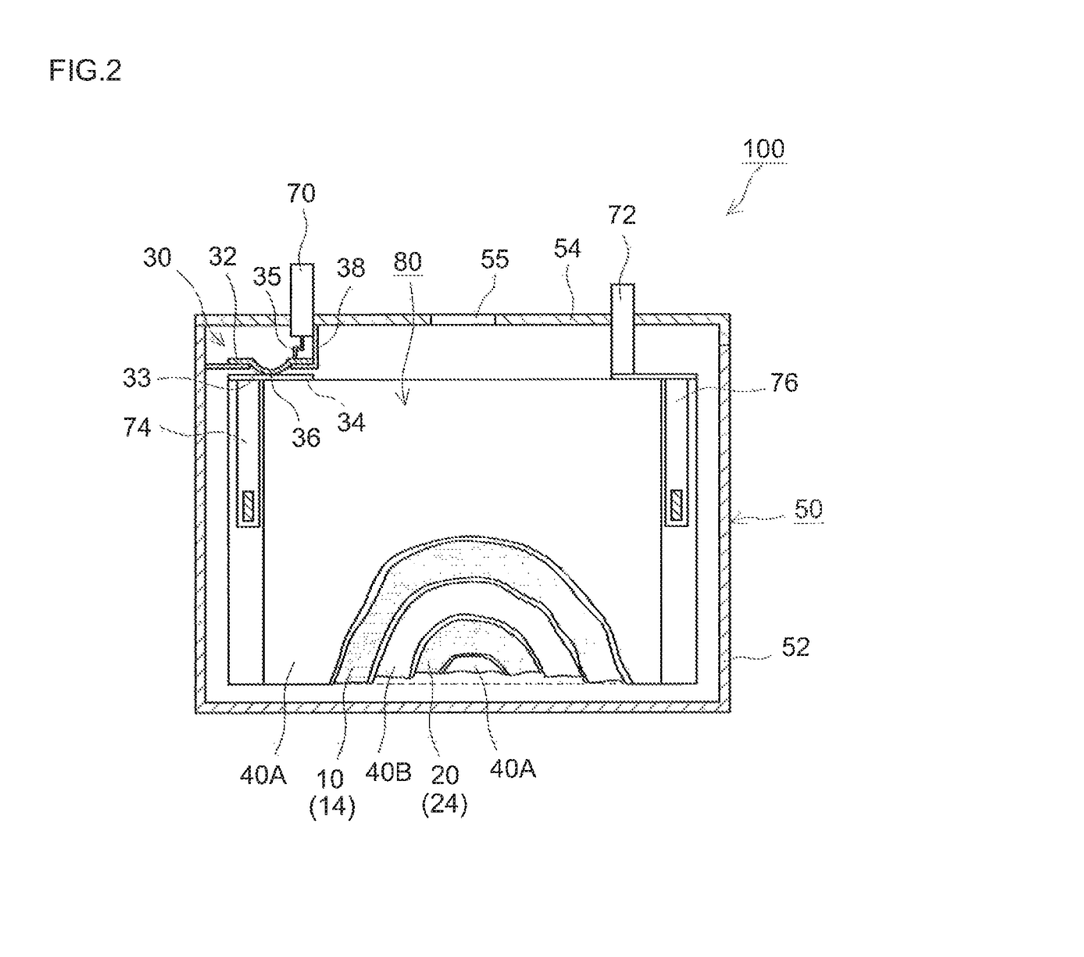
FIG. 2 is a diagram illustrating schematically the cross-sectional structure of the sealed lithium secondary battery illustrated in FIG. 1, along line II-II.
Figure 3:
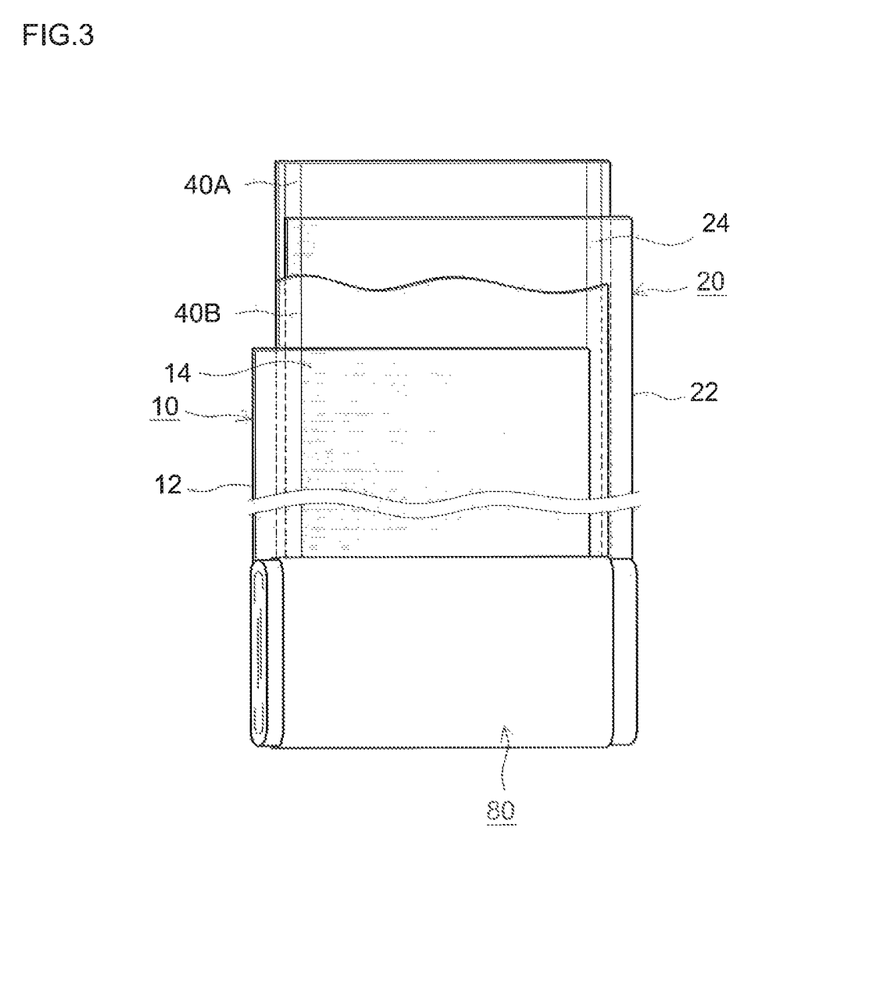
FIG. 3 is a schematic diagram illustrating the configuration of a wound electrode assembly of a sealed lithium secondary battery, according to an embodiment of the present invention.

Although not meant to be particularly limiting in any way, FIGS. 1 to 3 illustrate an example of a sealed lithium secondary battery (cell) of a form wherein a flat wound electrode assembly (wound electrode assembly) and a non-aqueous electrolyte are accommodated in a parallelepiped-shaped (box-shaped) container, as the schematic configuration of a sealed lithium secondary battery according to an embodiment of the present invention. In the drawings below, members and portions that elicit identical effects are denoted with identical reference numerals, and a recurrent explanation thereof will be omitted or simplified. The dimensional relationships (length, width, thickness and so forth) in the figures do not reflect actual dimensional relationships.

FIG. 1 is a perspective-view diagram illustrating schematically the external form of a sealed lithium secondary battery 100 according to an embodiment of the present invention. FIG. 2 is a diagram illustrating schematically the cross-sectional structure of the sealed lithium secondary battery illustrated in FIG. 1, along line II-II.

As illustrated in FIG. 1 and FIG. 2, the sealed lithium secondary battery 100 according to the present embodiment comprises a wound electrode assembly 80 and a hard case (outer container) 50. The hard case 50 comprises a hard case main body 52 having a parallelepiped shape (box shape) opened and the top end, and a lid body 54 that plugs the opening of the hard case main body 52. A positive electrode terminal 70 that is electrically connected to a positive electrode sheet of the wound electrode assembly 80 and a negative electrode terminal 72 that is electrically connected to a negative electrode sheet of the electrode assembly are provided on the top face (i.e. the lid body 54) of the hard case 50. A safety valve 55 for discharging to the exterior gas that is generated inside the battery case is provided in the lid body 54, in the same way as in the hard cases of conventional sealed lithium secondary batteries. The safety valve 55 is typically set so as to open at a pressure equal to or higher than the pressure at which the current interrupt device 30 is activated.

An elongate positive electrode sheet 10 and an elongate negative electrode sheet 20, and the electrode assembly (wound electrode assembly) 80, of a flat wound form, are accommodated, by way of interposed elongate separators 40A and 40B, and together with the nonaqueous electrolyte, not shown, inside the battery case 50. The positive electrode sheet 10 is formed in such a manner that a positive electrode mix layer 14 is not provided (or is removed), and the positive electrode collector 12 is exposed, at a first edge section along the longitudinal direction of the positive electrode sheet 10. Similarly, the wound negative electrode sheet 20 is formed in such a manner that a negative electrode mix layer 24 is not provided (or is removed) and a negative electrode collector 22 is exposed, at a first edge section along the longitudinal direction of the negative electrode sheet 20. A positive electrode collector plate 74 is provided at the exposed edge of the positive electrode collector 12, and a negative electrode collector plate 76 is provided at the exposed edge section of the negative electrode collector 22. The positive electrode terminal 70 and the negative electrode terminal 72 are electrically connected.

The current interrupt device 30 that is activated as a result of a rise in the internal pressure of the battery case is provided inside the battery case 50. The shape of the current interrupt device 30 is not particularly limited, so long as the current interrupt device 30 is configured in such a manner that a conductive path from at least one of the electrode terminals to the electrode assembly 80 (for instance, a charging path) is cut off if the internal pressure of the battery case 50 rises. In the present embodiment, the current interrupt device 30, which is provided between the electrode assembly 80 and the positive electrode terminal 70 that are fixed to the lid body 54, is configured in such a manner that the conductive path from the positive electrode terminal 70 to the electrode assembly 80 is cut off if the internal pressure of the battery case 50 rises.

More specifically, the current interrupt device 30 may comprise, for instance, a first member 32 and a second member 34. The current interrupt device 30 is configured in such a manner that at least one from among the first member 32 and the second member 34 deforms and moves away from the other member, so that the conductive path is cut off as a result, if the internal pressure of the battery case 50 rises. In the present embodiment, the first member 32 is a deforming metal plate and the second member 34 is a connecting metal plate that is joined to the deforming metal plate 32. The deforming metal plate (first member) 32 has, at the central portion thereof, a downward-curving arch shape, such that the peripheral edge portion is connected to the lower face of the positive electrode terminal 70 via a collecting lead terminal 35. The leading end of the curved portion 33 of the deforming metal plate 32 is joined to the top face of the connecting metal plate 34. The lower face (rear face) of the connecting metal plate 34 is joined to the positive electrode collector plate 74; the positive electrode collector plate 74 is connected to the positive electrode 10 of the electrode assembly 80. A conductive path becomes formed thus from the positive electrode terminal 70 to the electrode assembly 80.

The current interrupt device 30 comprises an insulating case 38 formed of plastic or the like. The insulating case 38, which is provided so as to surround the deforming metal plate 32, hermetically seals the top face of the latter. The internal pressure of the battery case 50 does not act on the top face of the hermetically sealed curved portion 33. The insulating case 38 has an opening through which the curved portion 33 of the deforming metal plate 32 is inserted. The lower face of the curved portion 33 is exposed to the interior of the battery case 50 through this opening. The internal pressure of the battery case 50 acts on the lower face of the curved portion 33 that is exposed to the interior of the battery case 50. When the internal pressure of the battery case 50 rises, the internal pressure acts on the lower face of the curved portion 33 of the deforming metal plate 32 in the current interrupt device 30 thus configured, and the curved portion 33 that is curved downward is pushed up. The upward push-up of the curved portion 33 increases as the internal pressure of the battery case 50 rises. When the internal pressure of the battery case 50 exceeds a set pressure, the curved portion 33 flips vertically and deforms so as to curve upward. A junction 36 between the deforming metal plate 32 and the connecting metal plate 34 becomes cut off due to the deformation of the curved portion 33. The conductive path from the positive electrode terminal 70 to the electrode assembly 80 becomes cut off as a result, and the overcharge current is interrupted.

The current interrupt device 30 is not limited to being provided on the positive electrode terminal 70 side, and may be provided on the negative electrode terminal 72 side. The current interrupt device 30 is not limited to being mechanically cut off upon deformation of the above-described deforming metal plate 32, and, for instance, an external circuit can be provided, as the current interrupt device, such that the charging current is cut off when the internal pressure of the battery case 50, as detected by a sensor, exceeds a set pressure.

FIG. 3 is a diagram illustrating schematically an elongate sheet structure (electrode sheet) at a stage prior to assembly of the wound electrode assembly 80. The positive electrode sheet 10 in which the positive electrode mix layer 14 is formed on one or both faces (typically, both faces) of the elongate positive electrode collector 12, in the longitudinal direction, and the negative electrode sheet 20 in which the negative electrode mix layer 24 is formed on one face or both faces (typically, both faces) of the elongate negative electrode collector 22, in the longitudinal direction, are stacked on each other together with the elongate separators 40A and 40B, and the whole is wound in the longitudinal direction, to produce a wound electrode assembly. The wound electrode assembly is squashed from the sides, to yield as a result the flat wound electrode assembly 80. From among lithium secondary batteries, batteries that are provided with a wound electrode assembly exhibit high capacity; accordingly, enhancing reliability (for instance, safety measures in case of malfunctions or the like) is an especially important issue. The technology disclosed herein allows increasing the safety of such a battery (for instance, safety upon occurrence of overcharge or internal short-circuits) with respect to that in conventional batteries.

Figure 4:
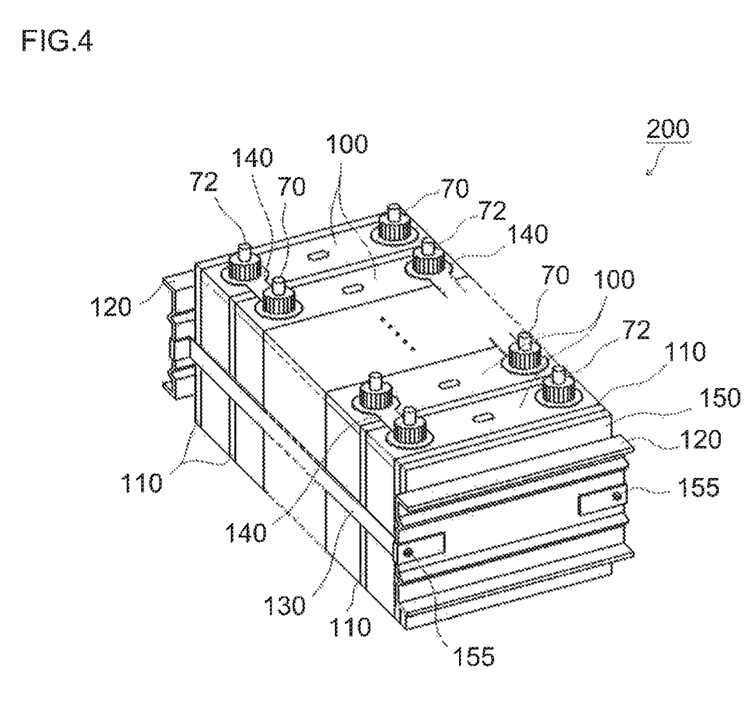
FIG. 4 is a perspective-view diagram illustrating schematically an assembled battery being a combination of a plurality of scaled lithium secondary batteries (cells) according to an embodiment of the present invention.

FIG. 4 illustrates an example of an assembled battery 200 that is provided with a plurality of the sealed lithium secondary batteries (cells) 100 (typically, an assembled battery resulting from connecting a plurality of cells in series and/or in parallel). In this assembled battery 200, a plurality (typically, 10 or more, preferably from about 10 to 30, for instance 20) sealed lithium secondary batteries (cells) 100 are arranged, inverted with respect to each other, in such a manner that respective positive electrode terminals 70 and negative electrode terminals 72 are disposed alternately, in the direction (stacking direction) in which the wide surfaces of the hard cases 50 oppose each other. Cooling plates 110 of a predetermined shape are sandwiched between the cells 100 thus arrayed. The cooling plates 110 function as heat-dissipating members for efficiently dissipating the heat generated in the cells 100 during use. Preferably, the cooling plates 110 have a shape that allows a cooling fluid (typically, air) to be introduced between the cells 100 (for instance, a shape such that the surface thereof is provided with a plurality of parallel grooves that extend perpendicularly from one side of a rectangular cooling plate to an opposing side of the latter). Preferred herein are cooling plates made of a metal having good thermal conductivity, or made of a lightweight and hard synthetic resin such as polypropylene.

A pair of end plates (restraining plates) 120 is provided at the two ends of the cells 100 and the cooling plates 110. One or a plurality of sheet-like spacer members 150, as length adjusting means, may be sandwiched between the cooling plates 110 and the end plates 120. The cells 100, the cooling plates 110 and the spacer members 150 thus arrayed are restrained in such a manner that a predetermined restraining pressure is applied in the stacking direction, by a restraint band 130 for tightening that is attached in such a manner so as to span across both end plates. More specifically, the edge sections of the restraint band 130 are fastened and fixed to the end plates 120 by way of screws 155; as a result, the cells and so forth are restrained in such a manner that the predetermined restraining pressure is applied in the array direction of the cells. The restraining pressure acts as a result also on the wound electrode assembly 80 that is accommodated inside the hard case 50 of each cell 100.

One positive electrode terminal 70 and another negative electrode terminal 72 of respective adjacent cells 100 are electrically connected by way of a connection member (bus bar) 140. Thus, the assembled battery 200 of desired voltage is constructed through connection of the cells 100 in series.

Figure 5:
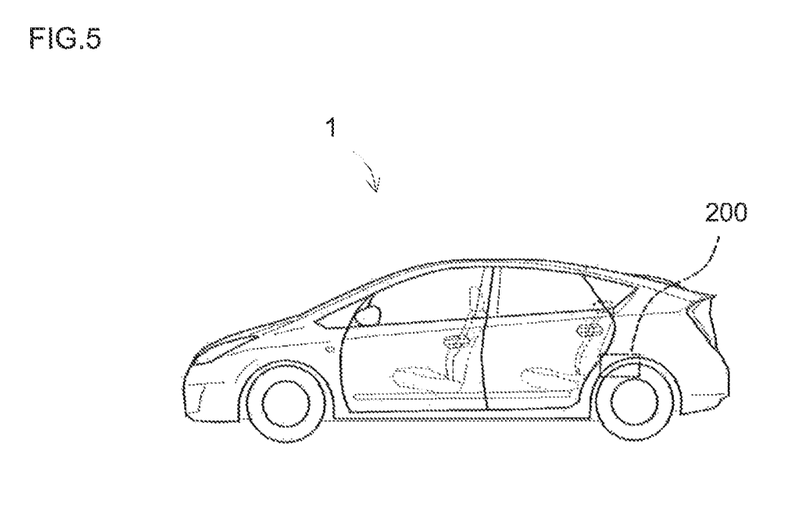
FIG. 5 is a side-view diagram illustrating a vehicle (automobile) provided with an assembled battery according to an embodiment of the present invention.

The sealed lithium secondary battery disclosed herein can be used in various applications, but the characterizing feature of the sealed lithium secondary battery is that safety is enhanced a wide range of temperature environments (for instance, 50 to 70° C.). Therefore, the sealed lithium secondary battery can be used in applications that require high energy density and output density, and applications where the temperature of the environment in which the battery is used or stands may rise to a high temperature. Therefore, the assembled battery 200 resulting from connecting a plurality of the sealed lithium secondary batteries disclosed herein can be suitably used as a motive power source (electric power source for driving) of a motor that is installed in a vehicle 1, such as an automobile, for instance as illustrated in FIG. 5. The type of the vehicle 1 is not particularly limited, and may be a plug-in hybrid automobile (PHV), a hybrid automobile (HV) or an electric vehicle (EV). The assembled battery 200 is used herein, but needless to say, the cell 100 may be used singly.

In the examples below, batteries will be evaluated, according to the method disclosed herein, as to differences in safety. However, the present invention is not meant to be limited to or by any of the features illustrated in the specific examples.

Construction of a Sealed Lithium Secondary Battery Construction

Example 1

To prepare a positive electrode mix slurry, $LiCoO_2$ powder as a positive electrode active material powder, acetylene black as a conductive material, and polyvinylidene fluoride (PVdF) as a binder, were charged into a kneader (planetary mixer), so as to yield a mass ratio of the foregoing materials of about 93:4:3, and the whole was kneaded while adjusting viscosity with N-methylpyrrolidone (NMP), to a solids concentration (NV) of about 50 mass %. The slurry was coated, to a width of 58.0 mm, onto an elongate aluminum foil (15 μm thick and 78 mm wide; 1085 by Sumitomo Light Metal Industries) as a positive electrode collector, and was dried, to form thereby a positive electrode mix layer. The resulting positive electrode was roll-pressed, to produce a sheet-like positive electrode (positive electrode sheet).

Next, a negative electrode mix slurry was prepared by charging natural graphite as a negative electrode active material, styrene butadiene rubber (SBR) as a binder, and carboxymethyl cellulose (CMC) as a dispersant into a kneader (planetary mixer) to a mass ratio of the foregoing materials of about 98:1:1, and kneading the whole while adjusting the viscosity with deionized water to a solids concentration (NV) of about 45 mass %. The slurry was coated, over a width of 60.9 mm, onto an elongate copper foil (20 μm thick and 80.9 mm wide), as a negative electrode collector, and the whole was dried, to form thereby a negative electrode mix layer. The resulting negative electrode was roll-pressed, to produce a sheet-like positive electrode (negative electrode sheet).

The positive electrode sheet and negative electrode sheet thus produced were stacked with two interposed sheet-like separators (the separators used herein had a single-layer structure of polyethylene (PE), and were 63.0 mm wide), and the obtained stack was wound. The resulting wound electrode assembly was squashed from the sides, to produce as a result a flat wound electrode assembly. A positive electrode terminal made of aluminum was joined, by welding, to an edge section (collector exposed section) of the positive electrode collector of the electrode assembly, and a negative electrode terminal made of copper was joined, by welding, to an edge section (collector exposed section) of the negative electrode collector.

The wound electrode assembly was accommodated in a square battery case (75 mm long, 120 mm wide and 15 mm high), a current interrupt device (CID) was arranged in the vicinity of the opening of the battery case, and a lid body was attached and sealed through welding. Then, 120 ml of a prepared nonaqueous electrolyte were injected through an injection opening of the battery case (the nonaqueous electrolyte used herein contained a solution resulting from dissolving $LiPF_6$ as an electrolyte to a concentration of about 1.0 mol/L in a mixed solvent comprising ethylene carbonate (EC), ethyl methyl carbonate (EMC) and diethyl carbonate (DEC), at a volume ratio of EC:EMC:DEC=3:5:2), plus curdlan (trade name "Curdlan NS", by Kirin Kyowa Foods Company) as a viscosity modifier, and biphenyl (BP) as an overcharge inhibitor, to a concentration of 0.1 mass % and 3.0 mass %, respectively), followed by joining by laser welding, to construct thereby five sealed lithium secondary batteries (Example 1) having a rated capacity of 4 Ah.

Example 2

In Example 2, sealed lithium secondary batteries (Example 2) were constructed in the same way as in Example 1, but herein curdlan was incorporated into the electrolyte at a concentration of 1.0 mass %.

Example 3

In Example 3, sealed lithium secondary batteries (Example 3) were constructed in the same way as in Example 1, but herein curdlan was incorporated into the electrolyte at a concentration of 5.0 mass %.

Example 4

In Example 4, sealed lithium secondary batteries (Example 4) were constructed in the same way as in Example 1, but herein curdlan was incorporated into the electrolyte at a concentration of 10 mass %.

Comparative Example 1

In Comparative example 1, sealed lithium secondary batteries (Comparative example 1) were constructed in the same way as in Example 1, but herein no curdlan was used.

Comparative Example 2

In Comparative example 2, sealed lithium secondary batteries (Comparative example 2) were constructed in the same way as in Example 4, but herein no biphenyl was used.

Comparative Example 3

In Comparative example 3, sealed lithium secondary batteries (Comparative example 3) were constructed in the same way as in Comparative example 2, but herein curdlan was incorporated into the electrolyte at a concentration of 20 mass %.

The features of the constructed batteries are summarized in Table 1.

TABLE 1

| | Additive in electrolyte | |
|---|---|---|
| | Viscosity modifier (curdlan) | Overcharge inhibitor (biphenyl) |
| Example 1 | 0.1 wt % | 3 wt % |
| Example 2 | 1 wt % | 3 wt % |
| Example 3 | 5 wt % | 3 wt % |
| Example 4 | 10 wt % | 3 wt % |
| Comparative example 1 | — | 3 wt % |
| Comparative example 2 | 10 wt % | — |
| Comparative example 3 | 20 wt % | — |

The constructed batteries (Examples 1 to 4 and Comparative examples 1 to 3) were subjected to a conditioning treatment in a temperature environment at 25° C. (the treatment involved herein an initial charge and discharge treatment or repeating twice an operation of charging the battery at constant current up to 4.1 V at a 0.2 C charge rate and an operation obtained discharging the battery at constant current down to 3.0 V at a 0.2 C discharge rate); thereafter, the batteries were subjected to an aging treatment (which involved charging at constant current up to 4.1 V, at a 0.2 C charge rate, and being held (left to stand) for 48 hours).

Measurement of Initial Capacity

After the aging treatment, in an environment at 25° C. each battery underwent an operation of charging at constant current (CC charging) up to 4.1 V, at a 1 C charge rate, with a 5-minute pause, and an operation of discharging (CC discharge) at constant current down to 3.0 V, at a 1 C discharge rate, with a 5-mute pause. The discharge capacity at the time of the CC discharge was taken as the initial capacity. The values thus obtained of initial capacity are given in corresponding rows of Table 2, in the form of values (relative values) normalized by being divided by the initial capacity of the battery of Comparative example 1. Thereafter, each battery was discharged at constant current down to 3.0 V, at a 1 C discharge rate, and was discharged at constant voltage until the discharge current was 0.1 C(CC-CV discharge).

Overcharge Test

Each battery having undergone the above initial capacity measurement was then left to stand for five hours or longer in a constant-temperature bath set to a predetermined environmental temperature (0° C., 20° C., 40° C., 60° C.), as given in Table 2. Each battery was charged at 1 C constant current until the SOC of the battery was 160% (herein, the 1 C current value was calculated taking as 100% the total of discharge capacity at the time of CC discharge and the discharge capacity at the time of CC-CV discharge above). It was further checked whether the safety mechanism (CID operation or current interruption) functioned normally or not.

The measurement results obtained are given in corresponding cells in Table 2. The column "number of cells safely stopped" in Table 2 denotes the number of batteries, from among the respective five constructed batteries (N=5), where the safety mechanism (CID operation or current interruption) functions normally in that the battery exhibits no change in appearance (specifically, exhibits for instance no battery heating or case deformation associated with a sharp rise in temperature).

TABLE 2

| | Number of cells safely stopped (N = 5) | | | | Battery capacity |
|---|---|---|---|---|---|
| | 0° C. | 20° C. | 40° C. | 60° C. | (Relative value) |
| Example 1 | 5 | 5 | 5 | 4 | 98.7 |
| Example 2 | 5 | 5 | 5 | 5 | 95.9 |
| Example 3 | 5 | 5 | 5 | 5 | 95.5 |
| Example 4 | 5 | 5 | 5 | 5 | 83.0 |
| Comparative example 1 | 5 | 5 | 2 | 0 | 100 |
| Comparative example 2 | 0 | 0 | 0 | 0 | 84.2 |
| Comparative example 3 | 0 | 0 | 0 | 1 | 67.2 |

As Table 2 shows, in Comparative example 1 (conventional art) the CID worked normally in a room temperature environment (specifically, 0° C. and 20° C.), but the operation of the CID became unstable as the environmental temperature rose, and the CID failed completely to work in an environment at 60° C. This may be ascribed to the fact that, as the environmental temperature rises, redox shuttle reactions of the aromatic compound occur preferentially, and the decomposition reaction of the aromatic compound is inhibited (i.e. the gas generation amount decreases), so that internal pressure failed to rise enough as to activate the current interrupt device.

In Examples 1 to 4 according to the present invention, by contrast, the CID worked stably in all temperature regions (0° C. to 70° C.), and exhibited enhanced safety at the time of overcharge as compared with Comparative example 1. It is deemed that the underlying reason for this is that drops in the viscosity of the electrolyte as the temperature rises are curtailed herein, and, as a result, the redox shuttle reactions of the aromatic compound that is the overcharge inhibitor are inhibited, also in a high-temperature environment. Accordingly, the aromatic compound decomposed appropriately, and hydrogen gas could be obtained stably in the amount necessary for activating the current interruption device reliably. This result illustrates the difference in the effect elicited by the present invention and conventional art. Specifically, the present invention was found to afford greater battery reliability (safety), in a wide range of temperature environments, as compared with conventional instances. In Examples 1 to 3 (specifically, where the addition proportion of viscosity modifier ranged from 0.1 mass % to 5 mass %), the drop in battery capacity was small; thus, the effect of the present invention (enhancing safety in a wide range of temperature environments) was combined, to a high degree, with superior battery performance (for instance, high output density).

In the battery of Comparative example 2 (conventional art), the CID did not work since no overcharge inhibitor had been added; further, the safety mechanism of current interruption failed to work on account of gelling of the electrolyte (increased charge transfer resistance), in all temperature regions. In the battery of Comparative example 3, where the addition amount of curdlan was increased, the safety mechanism by current interruption worked rarely, at a very low proportion, and not stably. Further, battery resistance increased, and irreversible capacity derived from side reactions increased likewise; accordingly, battery capacity was significantly reduced. It is deemed therefore that a significantly greater amount of curdlan must be incorporated into the electrolyte in order to enhance overcharge safety through addition of the viscosity modifier alone (i.e. without addition of the overcharge inhibitor). Such an addition is expected to result in yet poorer battery performance.

Viscosity Measurement

Changes in viscosity of the electrolyte with rising temperature were assessed. Specifically, solutions were produced by adding 0 mass %, 0.1 mass % and 1 mass % of curdlan, as a viscosity modifier, to the electrolyte used herein (electrolyte wherein $LiPF_6$ as the electrolyte was dissolved, to a concentration of about 1.0 mol/L, in a mixed solvent comprising ethylene carbonate (EC), ethyl methyl carbonate (EMC) and diethyl carbonate (DEC) at a volume ratio of 3:5:2). The changes in viscosity in the solutions upon changes in the environmental temperature were measured. The viscosity was measured using a rheometer (by TA Instruments), at a shear rate of 100 $sec^{-1}$. The results are illustrated in FIG. 6.

Figure 6:
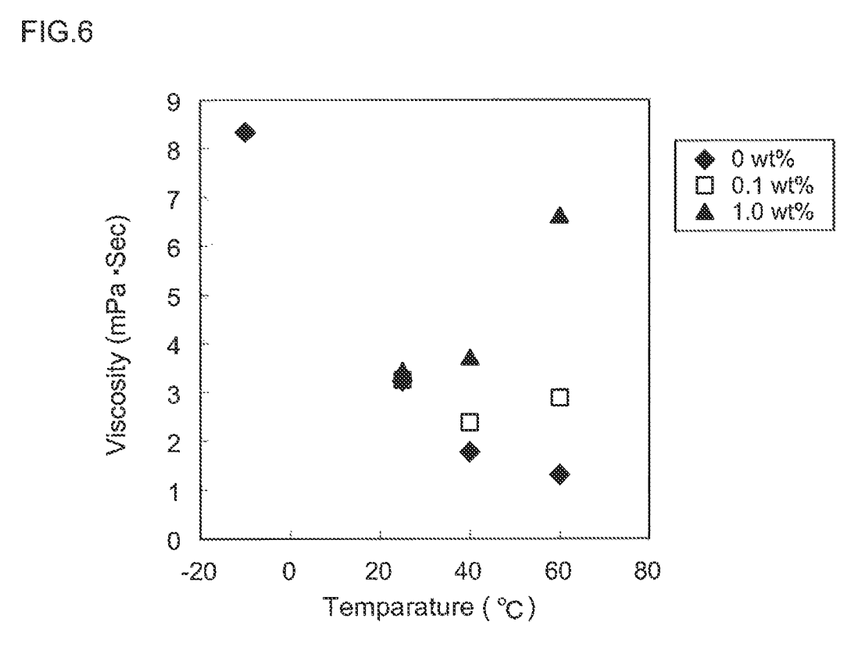
FIG. 6 is a graph illustrating the relationship between electrolyte viscosity (mPa·sec) and temperature (° C.).

As FIG. 6 shows, the viscosity of the electrolyte dropped significantly, as a result of a rise in the environmental temperature, in a case where no viscosity modifier was added ("0 mass %" in FIG. 6). On the other hand, drops in the viscosity of the electrolyte as a result of a rise in temperature were curtailed in those cases where curdlan was added as a viscosity modifier ("0.1 mass %" and "1 mass %" in FIG. 6). These results support the characterizing parts of the present invention.

Specific examples of the present invention have been explained in detail above, but these examples are merely illustrative in nature, and do not restrict the scope of the claims in any way. The technology set forth in the claims can accommodate all manner of variations and modifications of the specific examples illustrated above.

INDUSTRIAL APPLICABILITY

As a characterizing feature, the sealed lithium secondary battery disclosed herein combines, to a high degree, enhanced reliability (safety in a wide range of temperature environments) with superior battery performance (for instance, reduced battery resistance). Accordingly, the sealed lithium secondary battery can be used, particularly suitably, in applications that require high energy density and/or high output density, and/or applications where the temperature of the environment in which the battery is used or stands may rise to a high temperature (for instance, motive power source (electric power source for driving) of motors installed in vehicles such as automobiles). The type of the vehicle is not particularly limited, and the vehicle may be typically a plug-in hybrid automobile (PHV), a hybrid automobile (HV) or an electric vehicle (EV).

REFERENCE SIGNS LIST 1 automobile (vehicle)
10 positive electrode sheet (positive electrode)
12 positive electrode collector
14 positive electrode mix layer
20 negative electrode sheet (negative electrode)
22 negative electrode collector
24 negative electrode mix layer
30 current interrupt device
32 deforming metal plate (first member)
34 connecting metal plate (second member)
38 insulating case
40A, 40B separator sheet
50 hard case
52 case main body
54 lid body
55 safety valve
70 positive electrode terminal
72 negative electrode terminal
80 wound electrode assembly
90 flat plate
100 sealed lithium secondary battery
110 cooling plate
120 end plate
130 restraint band
140 connection member
150 spacer member
155 screw
200 assembled battery

The invention claimed is:

1. A sealed lithium secondary battery in which an electrode assembly provided with a positive electrode and a negative electrode, and an electrolyte, are accommodated inside a predetermined battery case, wherein
said electrolyte contains a compound that is capable of suppressing drops in viscosity of said electrolyte as a result of a rise in temperature in a temperature region up to 100° C., the compound including at least one polysaccharide and the at least one polysaccharide including at least curdlan, and an aromatic compound capable of generating hydrogen gas when a predetermined battery voltage is exceeded; and
said battery case includes a current interrupt device that is activated when the pressure inside said battery case rises as a result of generating said hydrogen gas.

2. The sealed lithium secondary battery according to claim 1, wherein said electrolyte has a ratio ($V_{60}/V_{25}$) of viscosity at 25° C. ($V_{25}$) and viscosity at 60° C. ($V_{60}$) ranging from 0.8 to 10, as measured using a rheometer under a condition of shear rate 100 $s^{-1}$.

3. The sealed lithium secondary battery according to claim 1, wherein an addition amount of said compound that is capable of suppressing drops in viscosity of said electrolyte as a result of a rise in temperature ranges from 0.1 mass % to 10 mass % with respect to 100 mass % of said electrolyte.

4. The sealed lithium secondary battery according to claim 1, wherein said aromatic compound includes cyclohexylbenzene and/or biphenyl.

5. The sealed lithium secondary battery according to claim 1, wherein an addition amount of said aromatic compound ranges from 0.5 mass % to 5 mass % with respect to 100 mass % of said electrolyte.

6. An assembled battery, comprising a plurality of sealed lithium secondary batteries according to claim 1.

7. A vehicle, comprising the assembled battery according to claim 6 as an electric power source for driving.

* * * * *